July 25, 1939.  L. A. SAFFORD  2,167,057

AIR BRAKE

Filed June 20, 1938

Inventor
Lewis A. Safford
By
Dodge and Sons
Attorneys

Patented July 25, 1939

2,167,057

UNITED STATES PATENT OFFICE 2,167,057

AIR BRAKE

Lewis A. Safford, Watertown, N. Y., assignor to The New York Air Brake Company, a corporation of New Jersey Application June 20, 1938, Serial No. 214,827

10 Claims. (Cl. 303—56)

This invention relates to air brakes, and particularly to lubrication of the seated face of the rotary valve forming a component of engineer's brake valves.

It is important that an engineer's brake valve operate easily because its manipulation must be accurately timed to effect smooth train handling. If a high frictional condition exists between the valve and its seat, difficulty is experienced in accurately manipulating the valve. In engineer's brake valves, the rotary valve is forced into contact with the seat by main reservoir pressure (or, in some types, by the pressure delivered by the feed valve). A close fit between the valve and its seat is necessary to avoid leakage. Consequently, in the absence of adequate and reliable lubrication, there will be considerable friction.

The problem of satisfactorily lubricating conventional valves used with automatic systems has not previously been solved. In the methods now in use, the lubricant either does not reach the entire bearing surface or it is rapidly blown from the lubricant reservoir or sucked from the bearing surface by air flowing through the valve.

One present practice is to lubricate the valve with high grade graphite, but the graphite soon works to the outer periphery, leaving the bearing zones between the valve and its seat without a film of lubricant. The result is that the metals tend to seize and the resistance to brake valve movement becomes excessive.

Various other methods of lubricating the rotary valve have been proposed. Where the valve is of the inverted rotary type, such as those used with schedule H. S. C., an efficient method of lubrication can be provided by radial and circular oil grooves in the bearing faces, fed from an oil well around the periphery of the rotary valve stem, which extends upward through the seat. In the conventional rotary valve, the rotary valve is not inverted but is on top of its seat; the actuating stem is connected to the top face of the rotary by a so-called key, and the space about the valve is at high pneumatic pressure. Hence, delivery of oil to the valve through the handle connection is impracticable for obvious reasons. The present invention provides satisfactory lubrication, particularly for valves of this type.

In accordance with the above considerations, the main object of my invention is to provide an engineer's rotary brake valve with a lubricating reservoir so designed as to insure positive flow of lubricant to the bearing surfaces, such flow being restricted to a slow and gradual seepage such that rapid draining of the oil reservoir and withdrawal of lubricant from the bearing surfaces is avoided. Consequently, lubrication of the seated surface of the valve is assured.

To accomplish this object, I subject the top of the oil well to the air pressure above the valve so that oil will be forced out through passages to grooves in the seated face of the valve which are maintained at lower air pressure. In the passages I place flow controlling inserts of a porous metallic composition so that the oil will be restrained to a slow and gradual flow.

A particular embodiment of this construction will now be described in detail.

In the accompanying drawing:—

Figure 1:
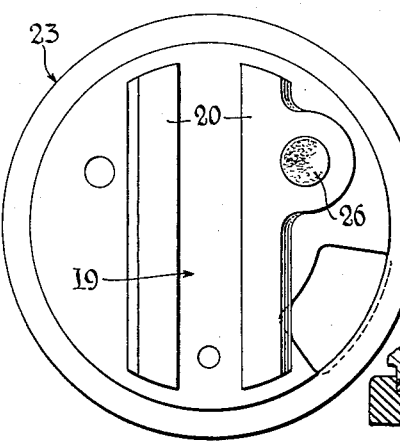
Figure 1 is a top view of the rotary valve of a standard No. 8 engineer's brake valve modified to include the present invention.
Figure 3:
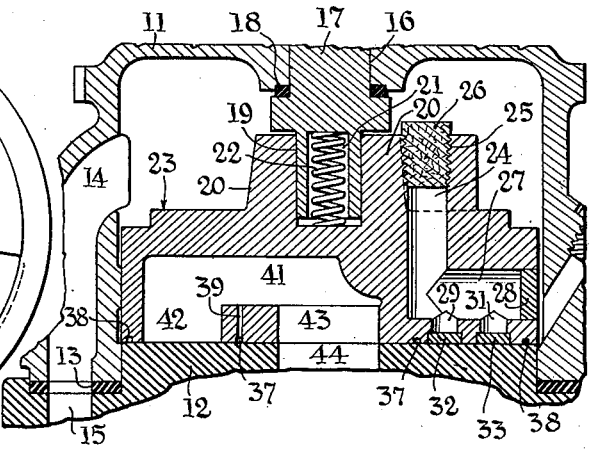
Fig. 3 is a vertical section on line 3—3 of Fig. 2, with part of the valve seat, bonnet and stem also shown.
Figure 2:
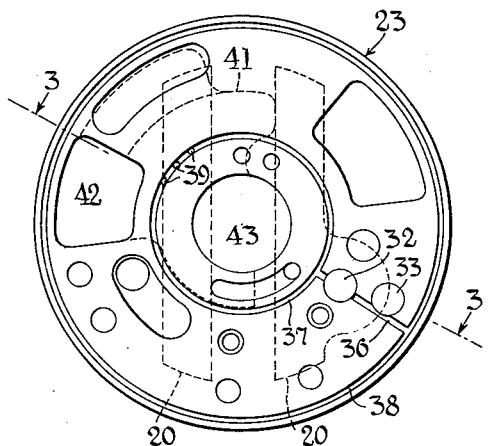
Fig. 2 is a view of the lower face of the rotary valve showing the porous inserts and their relationship to oil distributing grooves in the face of the valve.
Figure 4:
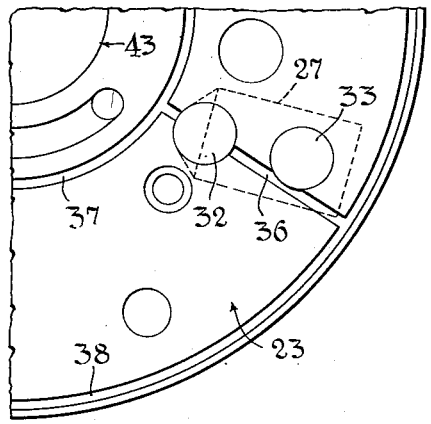
Fig. 4 is an enlarged fragmentary view similar to a portion of Fig. 2.

The porting of the rotary valve is standard and hence needs no description beyond the identification of the exhaust port which is connected to certain oil grooves to maintain them at atmospheric pressure.

Valve bonnet 11 rests upon gasket 13 and makes a tight seal with the valve seat member 12. Within the bonnet is a passage 14 leading to a similar passage 15 in the valve seat which connects with the source of pressure fluid being controlled, in this case main reservoir air. The bonnet has a central opening 16 through which projects the valve stem 17. The gasket 18 ensures a tight seal between the valve stem 17 and the bonnet 11. The lower part of the valve stem 17 takes the form of a key which fits into a groove 19 between two lugs 20 on the rotary valve body. Stem 17 is counterbored at 21 to receive a coil compression spring 22 whose lower end reacts against the rotary valve and urges the stem 17 upward to produce a seal with gasket 18.

In the valve body 23 is drilled an oil well 24 whose upper end is tapped at 25 to receive a porous felt plug 26. The purpose of this plug is to exclude foreign matter from the oil well and, at the same time, permit compressed air to pass freely. The well 24 is enlarged by cross drilling as indicated at 27, the outer end of the cross drilled enlargement being plugged at 28. Leading from the oil well are two passages 29 and 31, whose lower ends are counterbored to receive flow controlling disks 32 and 33, each of a porous brass or bronze composition. That sold under the trade-name "Oilite" and used in the automotive industry as an oil saturated bearing bushing, is satisfactory. So far as known, this material has never been used to control the flow of oil under pressure. These disks 32, 33 are flush with the valve face. Disk 32 intercepts a radial groove 36 in the face of the valve. The edge of disk 33 does not obstruct the radial groove 36.

At its inner end groove 36 connects with a circular groove 37 which is concentric with the axis of the valve and engages no valve seat ports. At its outer end groove 36 connects with a circular groove 38 also concentric with the axis of the valve and located outside of all valve seat ports. Groove 37 is vented to atmosphere through passages 39 leading to a cavity 41. Cavity 41 connects exhaust port 42 with central exhaust 43 which at all times is in registry with exhaust port 44 in the valve seat leading to the atmosphere.

Oil well 24 and 27 is filled with lubricating fluid. The felt plug 26 is saturated in a similar lubricating fluid and screwed into the tapped end of well 24.

During the operation of an engineer's brake valve rotary the upper face of the rotary is subjected to main reservoir pressure and thus a constant pressure is maintained above the oil in well 24 and 27 through the felt plug 26, so that oil is gradually fed through the porous disks 32 and 33 to the distributing grooves 36, 37 and 38. As long as there is any oil above the disks 32 and 33, no air can pass through them. Groove 37 is at atmospheric pressure. Groove 38 and the outer portion of groove 36 are at a pressure only slightly below supply air pressure, since plug 32 restricts inward flow through groove 36 to groove 37. Thus groove 37 is fed with oil, but only at a restricted rate and groove 38 (via plug 33 and groove 36) is fed more copiously. Since any air leakage tendency is toward the center of the valve, the effect favors uniform oil distribution.

With this construction, satisfactory lubrication of the valve is obtained at all times. This lubrication is constant and reliable; it does not fail until the supply of oil in the well is exhausted. Actual use demonstrates that one filling of the well will provide efficient lubrication for the valve over a period of approximately six months.

What is claimed is:

1. Lubricating means for the valves of air brakes and like devices comprising in combination a ported valve seat; a ported valve shiftably seated thereon; means for subjecting said valve on its back or unseated face to supply pressure, and for subjecting a portion of the valve substantially at the center of its seated area and within the effective ported area of the valve and seat to a lower pressure; an oil reservoir open at its top to supply air pressure; oil feeding connections from the lower portion of said reservoir to the mating surfaces of the valve and seat comprising at least one porous metal insert forming a portion of one of said surfaces, and means for subjecting the lower portion of said insert to said lower pressure.

2. Lubricating means for the valves of air brakes and like devices comprising in combination a ported valve seat; a ported valve shiftably seated thereon; means for subjecting said valve on its back or unseated face to supply pressure, and for subjecting a portion of the valve substantially at the center of its seated area and within the effective ported area of the valve and seat to a lower pressure; an oil reservoir open at its top to supply air pressure; and oil feeding connections from the lower portion of said reservoir to the mating surfaces of the valve and seat comprising at least one porous metal insert forming a portion of one of said surfaces, there being oil grooves encircling the inner and outer margins of said effective ported area, the inner groove being subject to said lower pressure, and the outer groove communicating with the inner through said porous insert.

3. The combination defined in claim 2, in which the inner and outer grooves are connected by a third groove extending across the ported area, and at least two porous inserts are used one of which obstructs the third groove, and the other of which is located outward relatively to said obstructing insert.

4. The combination defined in claim 2, in which the inner and outer grooves are connected by a third groove extending across the ported area, and at least two porous inserts are used one of which obstructs the third groove, and the other of which is located outward relatively to said obstructing insert and supplies oil to said outer groove.

5. The combination defined in claim 2, in which the oil reservoir, porous insert and grooves are all formed in the valve, whereby the lubricating equipment may be renewed simply by the replacement of the rotary valve.

6. The combination defined in claim 2, in which the reservoir, and at least two porous inserts are mounted in the valve, and the inner and outer groove are also formed in the valve and connected by a third groove extending across the ported area, the inserts being so located that one obstructs said connecting groove and another supplies oil at least indirectly to the outer groove.

7. A rotary valve for substitution in existing brake valves of the type in which the back or unseated face of the rotary valve is subject to supply air pressure and the seated surface of the valve has a central exhaust port encircled by ports which control the functional flows provided by the valve, said valve having an oil reservoir open at its top to supply pressure and communicating beneath the level of contained oil with the seated surface through at least one porous metal insert forming part of the seated surface of the valve, said seated surface of the valve having an oil groove encircling said encircling ports and communicating with said exhaust port by way of said porous insert.

8. In an engineer's valve, the combination with a valve seat; a valve adapted to rotate thereon, said valve having in its seated face arcuate and radial oil grooves, the inner arcuate groove being vented to atmosphere; means for restricting the flow of oil comprising porous disks; and a source of oil under pressure connecting through said disks with the radial groove, whereby a pressure differential is set up between the inner arcuate groove and said oil source, causing a flow of oil from said source through said disks to said grooves.

9. In an engineer's valve, the combination with a valve seat; a valve adapted to rotate thereon, said valve having in its seated face arcuate grooves and a radial groove connecting said arcuate grooves; porous metal disks in the face of said valve, one of which wholly, another partially, intercepts said radial groove; and a reservoir for supplying oil to said disks.

10. An engineer's rotary valve having in its face a radial and two circular oil grooves; and two porous metal disks, the radial groove connecting the two circular grooves but intercepted partly by one porous disk, wholly by the other porous disk, said valve having within it a lubricant reservoir and lubricant supply passages leading to said disks, whereby said disks form the delivery ends of said lubricant supply passages.

LEWIS A. SAFFORD.